Figure 1:
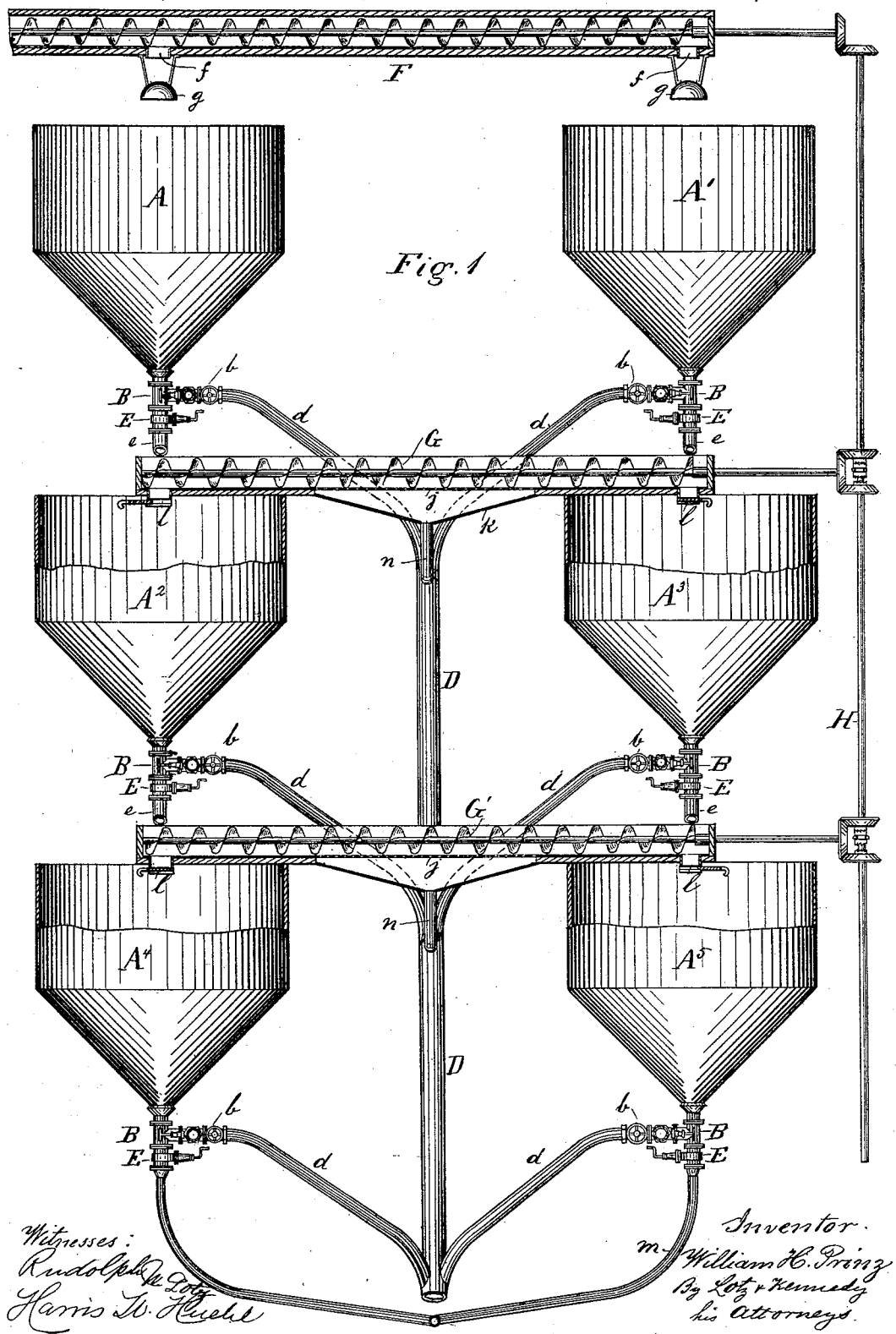

(No Model.) 2 Sheets—Sheet 1.

W. H. PRINZ.
GRAIN STEEPING AND WASHING APPARATUS.

No. 500,509. Patented June 27, 1893.

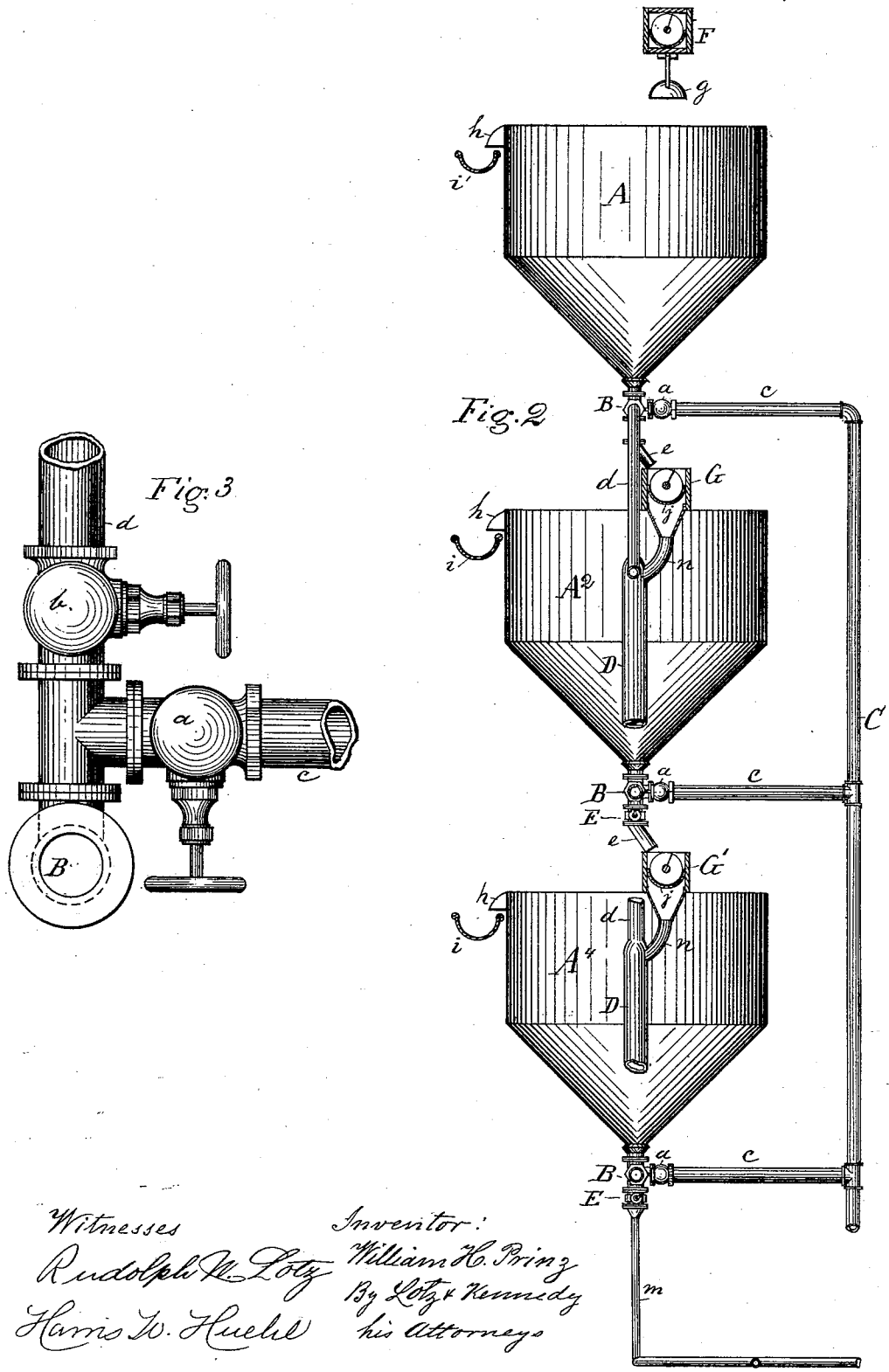

UNITED STATES PATENT OFFICE.

WILLIAM H. PRINZ, OF CHICAGO, ILLINOIS, ASSIGNOR TO THE SALADIN PNEUMATIC MALTING CONSTRUCTION COMPANY, OF SAME PLACE.

GRAIN STEEPING AND WASHING APPARATUS.

SPECIFICATION forming part of Letters Patent No. 500,509, dated June 27, 1893.

Application filed March 29, 1892. Serial No. 426,973. (No model.)

*To all whom it may concern:*

Be it known that I, WILLIAM H. PRINZ, a citizen of the United States, residing at Chicago, in the county of Cook and State of Illinois, have invented certain new and useful Improvements in Grain Steeping and Washing Apparatus; and I do hereby declare the following to be a full, clear, and exact description of the invention, such as will enable others skilled in the art to which it appertains to make and use the same.

This my invention relates to the malting of grain, and more particularly to a novel process and apparatus for steeping the same previous to the germinating thereof.

The steeping of grain is generally accomplished in tanks having hopper bottoms and provided with valves and pipes for admitting fresh water and for draining off the water after it becomes slimy from the impurities adhering to the grain and for each steep it is necessary therefore to change the water several times before the grain becomes sufficiently soaked with water for the further process of sprouting. These steep tanks formerly were all placed on the same level, with the same grain remaining in each until ready to be discharged therefrom on to the floor for germinating and the fresh water was generally fed in from the top while the slimy water was discharged through a valve at the bottom of the tank. The objection to this system has been that the air contained in the grain will but slowly rise to the top, and that the top surface of the grain was thus brought in contact with the oxygen in such air causing its precedent sprouting, whereby a uniform germination of all the grain was made almost impossible, and again that with changing the water, by discharging the dirty water, first entire and then by refilling the tank with fresh water, the lower strata of grain was submerged almost continuously while the upper strata were exposed to the air for quite a while, which again tended to cause an irregular sprouting.

The object of this my invention is to overcome these objections, and it consists in the several novel steps composing my process, and in the features of construction of my apparatus, as will be fully described and specifically claimed.

In the accompanying drawings, Figure 1 represents a partly sectional front elevation and Fig. 2, a partly sectional side elevation of the steeping apparatus, and Fig. 3 a plan view of the valves of one of the steep tanks detached.

Corresponding letters in the several figures of the drawings designate like parts.

In the said drawings I have illustrated one embodiment of the apparatus for carrying out my novel process, and I will now proceed to describe said apparatus by reference to the said drawings.

A, A', $A^2$, $A^3$, $A^4$ and $A^5$ denote a series of tanks each having a hopper bottom. These tanks as shown are placed in two vertical rows each of three tanks one above the other, two of opposite rows being on same horizontal positions, but I do not desire to be held to the exact number of tanks placed vertically nor the number of rows, since this may be altered to accommodate the space in the building. Each such tank has a T-nozzle B to its bottom, to which valves $a$ and $b$ are attached, one through a branch pipe C to communicate with a fresh water supply pipe C and the other through a branch pipe $d$ to communicate with the soil or waste pipe D. To the bottom of nozzle B is again secured a gate valve E of any usual construction, and to the bottom of this gate valve again is attached a spout $e$, which may be secured by a swivel joint so as to be turned for discharging in different directions. Such a spout $e$ however, may only be provided for the valves of the upper steep tanks, while for the lowest ones the valves E may be connected with a train of pipes $m$ through which the steeped grain may be conveyed mixed with the last steep water as will be desirable, for malt houses in which the grain is germinated on perforated floors by the pneumatic system.

Above the upper steep tanks A and A', is provided a spiral conveyer F for transporting the dry grain to be steeped from a grain bin or elevator. This conveyer F is provided with spouts $f$ one over each tank, and each having a suitable gate for closing it and underneath each such spout is suspended on rods a semi-spherical shell $g$ upon which the grain issuing from the spout will fall and be scattered radially in all directions, so that each kernel is separated from the other when dropping in the water of the tank to be at once inundated.

Over the top of the two tanks $A^2$, and $A^3$, and again of the two tanks $A^4$, and $A^5$, is placed a spiral conveyer G and G' in positions that the spouts $e$ of the tanks above will discharge therein. The box of each such conveyer has a spout $l$ in each end, discharging into the tank below, and each such spout is to be provided with a proper gate for shutting the outlet. Intermediate of these spouts $l$ each conveyer box has a perforated bottom $g$ and a false hopper or funnel-like bottom $k$ communicating through a branch pipe $n$ with the waste or soil pipe D. The conveyers F, G and G' are set in motion by an upright shaft H and suitable gearing and clutches or by any other suitable transmission in a manner that either one can be driven alone and that the conveyers G and G' can be rotated in either direction. By this device the grain from tank A can be carried over and dumped into tank $A^3$ and the grain from tank A' can be carried over and dumped into tank $A^2$ and the grain from tank $A^2$ can be carried over and dumped into tank $A^5$ and the grain from tank $A^3$ can be carried over and dumped into tank $A^4$, the object being that by moving such grain while thoroughly saturated or mixed with the water its kernels by being rolled along will rub against each other and will also be rubbed by the conveyer flights so as to loosen and separate all impurities adhering thereto which impurities will then be carried off with the water draining off through the perforated bottom $g$.

Each tank has to its upper edge an overflow spout $h$ that discharges into a trough $i$, and all these troughs $i$ may be connected by suitable conductor pipes with the soil and waste pipe D.

For changing the steep water in a tank its valve $a$ is turned open, when the fresh water rising in the tank from the bottom upward, will displace the old water that will overflow and discharge through spout $h$, carrying with it all slimy matter and impurities dissolved by such water. By this arrangement it will be readily seen all the grain in the steep tank will remain submerged in the water while the steep water is renewed.

After a tank A has been emptied entirely and before it is recharged, it should be washed and flushed with water, which is done from top by means of a hose, while the valve $b$ is turned open, for this flushing water to run off. With this arrangement of three tanks in a vertical row, the grain is allowed to remain one-third its time for steeping in the upper tank, again one-third its time for steeping in the middle tank and again the balance of its steeping time in the lower tank, while the grain by each transfer from an upper to a lower tank is thoroughly mixed and washed, all by the most simple means. And further as will be noted that in each transfer of the grain from an upper to a lower tank, the upper strata in the upper tank will become the lower strata in the lower tank because when the valves E are first opened a little of the grain at the bottom of the tank first passes out until what is known as the "funnel" is formed, and thereafter the uppermost layer of grain in the tank passes out until the tank is emptied, in the same manner that grain usually runs out of a tank or bin through an opening at the bottom of the same.

In small malt houses, in which three steep tanks will suffice these tanks may be set in such relative position as perhaps tanks A, $A^3$ and $A^4$ with the conveyers G and G' in similar positions, so as to move the grain from the uppermost to the lowermost tank in a somewhat zigzag direction.

It will be obvious that in accordance with the principle comprised by my invention various changes can be made in the construction of the apparatus and in the steps composing my process without departing from the spirit of my invention, and except in the claims for the specific construction and process, I do not wish to be understood as limiting my invention to the specific construction illustrated nor the specific steps of said process.

I claim as my invention—

1. The herein described process of steeping grain which consists in carrying on the steeping process for the same body of grain in a plurality of separate compartments in each of which the steeping process is partially completed, and in the successive movement of the grain from one compartment to another, substantially as set forth and described.

2. The herein described process of steeping grain which consists in carrying on the steeping process for the same body of grain in a plurality of separate compartments in each of which the steeping process is partially completed, in the successive movement of the grain from one compartment to another, and in placing the grain that is uppermost in one compartment lowermost in the succeeding compartment, substantially as set forth and described.

3. The herein described process of steeping grain which consists in carrying on the steeping process for the same body of grain in a plurality of separate compartments in each of which the steeping process is partially completed in the successive movement of the grain from one compartment to another and in washing or scouring the grain after each partial steeping process.

4. The herein described process of steeping grain which consists in carrying on the steeping process for the same body of grain in a plurality of separate compartments in each of which the steeping process is partially completed in the successive movement of the grain from one compartment to another, and in washing or scouring such grain as it is being conveyed.

5. The combination substantially as hereinbefore set forth in an apparatus for steeping grain of a plurality of steep tanks in each of which the steeping operation is partially completed and devices for conveying the grain from one steep tank to another substantially as set forth and described.

6. The combination substantially as hereinbefore set forth in an apparatus for steeping grain of a plurality of steep tanks in each of which the steeping operation is partially completed and devices located between the same practically as described to convey the grain from the lower end of one steep tank to the upper end of each succeeding steep tank.

7. A plurality of steep tanks, devices located between the same practically as described to convey the grain from the lower end of one steep tank to the upper end of each succeeding steep tank, and for washing or scouring the grain as the same is being conveyed, substantially as described.

8. A plurality of steep tanks located one above the other and a spiral conveyer leading from the lower end of one tank to the upper end of each succeeding tank substantially as set forth and described.

9. A plurality of steep tanks located one above the other, a spiral conveyer leading from the lower end of one steep tank to the upper end of each succeeding steep tank, a perforated box located beneath the conveyer and a false bottom located beneath said perforated box and communicating with an outlet pipe $n$ substantially as set forth and described.

10. A plurality of steep tanks located at different elevations and located alternately in different vertical rows, and devices located between the lower end of one tank of one row and the upper end of the next tank below the same in the other row for conveying grain from the lower end of one tank to the upper end of the other tank, and for washing and scouring the grain as the same is being conveyed between the tanks, substantially as described.

11. A plurality of steep tanks located at different elevations and located alternately in different vertical rows, a conveyer located between the lower end of one tank of one row and the upper end of the next tank below the same in the other row for conveying grain from the lower end of one tank to the upper end of the other tank, a perforated box located beneath the conveyer, and a false bottom located beneath said perforated box and communicating with an outlet pipe, substantially as described.

In testimony whereof I affix my signature in presence of two witnesses.

WILLIAM H. PRINZ.

Witnesses:
WM. H. LOTZ,
RUDOLPH W. LOTZ.